United States Patent
Zanin

(10) Patent No.: US 6,604,442 B2
(45) Date of Patent: Aug. 12, 2003

(54) TWIN-HEAD BEVELING MACHINE FOR HIGH-PRECISION MACHINING ON HEADS OF LARGE-AND MEDIUM-DIAMETER PIPES

(75) Inventor: Pierluigi Zanin, Selvazzano (IT)

(73) Assignee: Goriziane S.p.A., Villesse (IT)

( * ) Notice: Subject to any disclaimer, the term of this patent is extended or adjusted under 35 U.S.C. 154(b) by 0 days.

(21) Appl. No.: 09/985,233

(22) Filed: Nov. 2, 2001

(65) Prior Publication Data

US 2002/0053267 A1 May 9, 2002

(30) Foreign Application Priority Data

Nov. 7, 2000 (IT) ...................................... TO2000A1041

(51) Int. Cl.[7] .............................. B23B 5/16; B23B 7/04
(52) U.S. Cl. .......................................... 82/113; 82/128
(58) Field of Search ........................... 82/113, 114, 117, 82/128, 129, 130, 131, 138; 408/36, 37, 233, 713

(56) References Cited

U.S. PATENT DOCUMENTS

| 3,733,939 | A | * | 5/1973 | Paysinger et al. | 82/113 |
|---|---|---|---|---|---|
| 4,126,065 | A | * | 11/1978 | Clavin | 82/113 |
| 4,186,630 | A | * | 2/1980 | Lindhag | 82/113 |
| 4,343,207 | A | * | 8/1982 | Paysinger | 82/128 |
| 4,411,178 | A | * | 10/1983 | Wachs et al. | 82/113 |
| 4,550,635 | A | * | 11/1985 | Kanayama et al. | 82/113 |
| 4,677,884 | A | * | 7/1987 | Kwech et al. | 82/113 |
| 4,774,746 | A | * | 10/1988 | Blaimschein | 29/26 A |
| 5,887,501 | A | * | 3/1999 | Ricci | 82/123 |
| 6,050,161 | A | * | 4/2000 | Tremblay | 82/113 |
| 6,189,425 | B1 | * | 2/2001 | Ricci et al. | 82/113 |
| 6,220,130 | B1 | * | 4/2001 | Beakley | 82/113 |

FOREIGN PATENT DOCUMENTS

IT    0 164 097   * 11/1985   ............. B23B/5/16

* cited by examiner

Primary Examiner—A. L. Wellington
Assistant Examiner—Brian D Walsh
(74) Attorney, Agent, or Firm—Guido Modiano; Albert Josif; Daniel O'Byrne

(57) ABSTRACT

A twin-head beveling machine for high-precision machining on heads of pipes, comprising two mutually opposite pressers and machining heads with a rotating disk; the pressers are rigidly connected to each other by a central fixed shaft and the heads are mounted so that they can rotate and move axially individually on the central fixed shaft. The machining heads are subjected to the action of hydraulic or pneumatic motors and of axial movement elements, which are activated by a respective hydraulic or pneumatic actuator and produce the axial working advancement of the respective head.

9 Claims, 6 Drawing Sheets

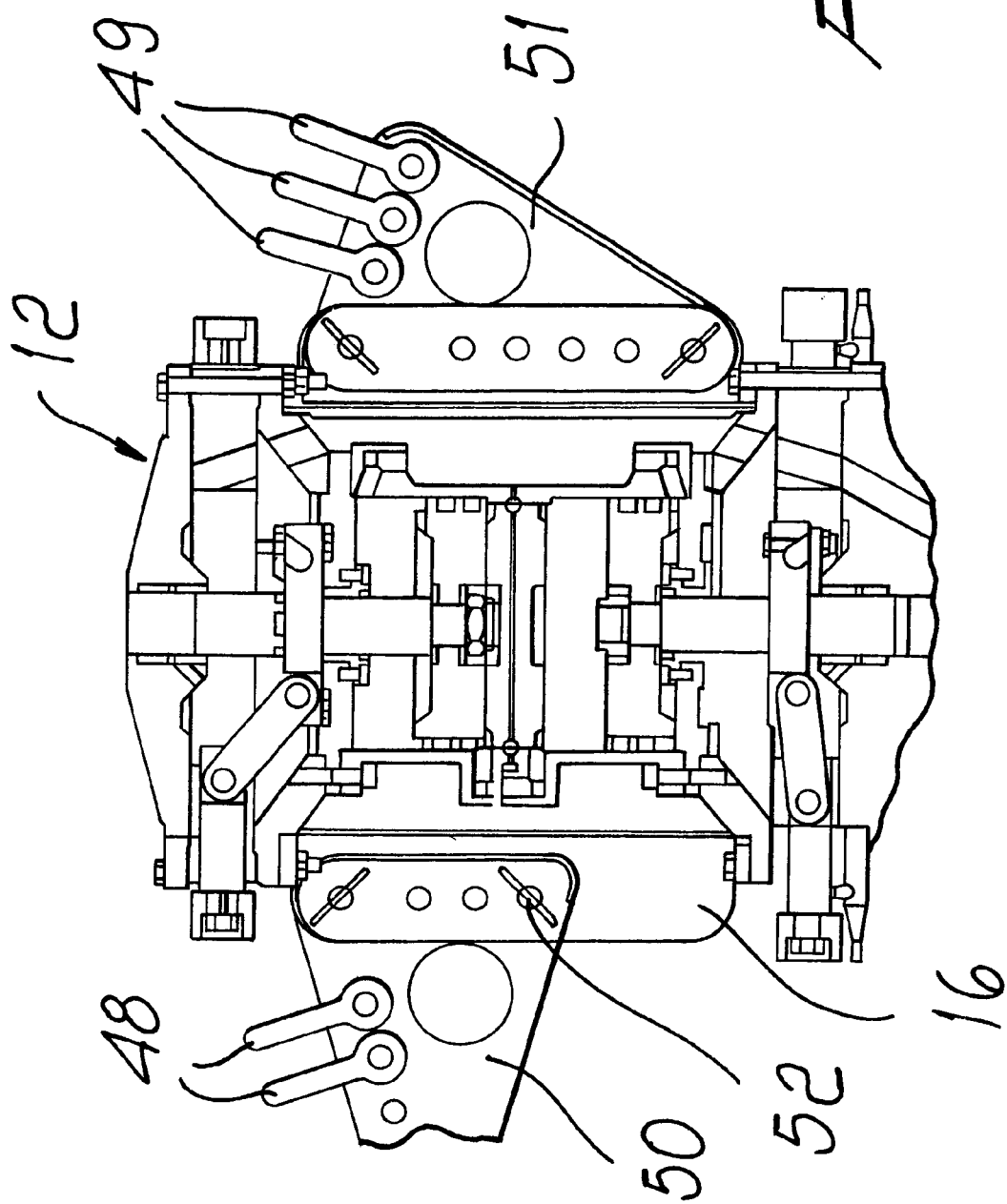

TWIN-HEAD BEVELING MACHINE FOR HIGH-PRECISION MACHINING ON HEADS OF LARGE-AND MEDIUM-DIAMETER PIPES

BACKGROUND OF THE INVENTION

The present invention relates to a beveling machine for machining the heads of large- and medium-diameter pipes, or more generally pipes of any diameter, such as pipes of oil pipelines, gas pipelines, and piping in general, particularly submarine piping arranged vertically or subvertically as well as vertical pipes constituting the supporting and foundation piling of offshore rigs.

More particularly, the invention relates to beveling machines that are adapted to form welding bevels or chamfers on the ends of such pipes and comprise an expander means and a machining head, which are combined and cooperate so that the expander means engages, by means of the radial expansion of its anchoring elements, the internal surface of the pipe being machined in order to center and retain the entire machine, and so that the machining head, which is meant to remain outside the pipe, supports and moves one or more tools that rotate around the pipe, performing the required chip-forming machining. For this purpose, the machining head is provided with a rotating disk, which is typically actuated by one or more hydraulic motors and is provided with a plurality of tool holders that can move radially and/or axially.

Although the assembly constituted by the machining head and the corresponding tool holders is structured so as to be very rigid, the machining standard of these known types of beveling machine is rather modest and is often unacceptable in modem fully automatic welding processes, in which the exactness of the profile of the welding bevel or chamfer is an absolutely critical and indispensable parameter in terms of the corresponding correct execution of said welding process. Usually, the imperfection of the machining performed by known types of beveling machine substantially depends on vibrations of the tool holders, which are transmitted to the entire machine and increase as the thickness and the mechanical characteristics of the material of the pipes being machined increase; both of these parameters have increased considerably in recent times, especially in the field of submarine piping, where the use of said known types of beveling machine is now fully inadequate. Furthermore, these known beveling machines are shaped so that they can work usefully essentially on pipes that are arranged horizontally, but some of the submarine piping is also produced, as is known, by welding together vertical or subvertical piping sections (with maximum inclinations of approximately 20°), which are then sunk without altering their vertical or subvertical arrangement. These production methods, too, cause the use of such known beveling machines to be inadequate in the laying of submarine piping and more generally in the laying of vertical pipes, for example for submarine piling and foundations.

SUMMARY OF THE INVENTION

The aim of the present invention, starting from the notion of these drawbacks and limitations of known beveling machines, is to eliminate them. Within this aim, an object of the present invention is to provide a beveling machine that is vibration-free and therefore capable of performing chip-forming machining operations that are extremely accurate and capable of producing bevels having a profile that is substantially equivalent to the profile that can be obtained with actual machine tools having a high quality standard.

Another object of the present invention is to provide a beveling machine that is adapted to machine the ends of pipes arranged vertically or subvertically as specified and is therefore especially adapted for machining the ends of pipes of submarine pipelines or of pipes of submarine piling and the like. In particular, a further object of the present invention is to provide a beveling machine that is also capable of performing selectively or simultaneously machining operations on mutually opposite ends of a pipeline divided into two vertical (or subvertical) segments between which the beveling machine proper is interposed.

This aim and these and other objects that will become better apparent hereinafter from the following detailed description are achieved with a beveling machine having the specific characteristics defined in the appended claims.

Substantially, the invention is based on the concept of providing a twin-head beveling machine that comprises two mutually opposite pressers and machining heads of the rotating-disk type, the pressers being rigidly connected to each other by a central fixed shaft, the machining heads being mounted so that they can rotate and move axially individually on the central fixed shaft and being subjected to the action of hydraulic or pneumatic motor means and of axial movement means, activated by a respective hydraulic or pneumatic actuator, which produce the axial working advancement of the respective head.

Furthermore, and substantially with the aim of eliminating vibrations so as to make the machine suitable to perform machining operations having the same machining standard as machine tools, the rotating disks of the machining heads have oscillating tool holders, each of which is provided with a respective sliding block subjected to the action of a retention means that is typically constituted by a clamping element and is adapted to limit or block completely the oscillation of the respective tool holder.

BRIEF DESCRIPTION OF THE DRAWINGS

Further characteristics and advantages of the twin-head beveling machine according to the present invention will become better apparent from the following detailed description and with reference to the accompanying drawings, given by way of non-limitative example and wherein:

FIG. 1b is a longitudinal sectional view of the other presser;

DESCRIPTION OF THE PREFERRED EMBODIMENTS

Figure 1:
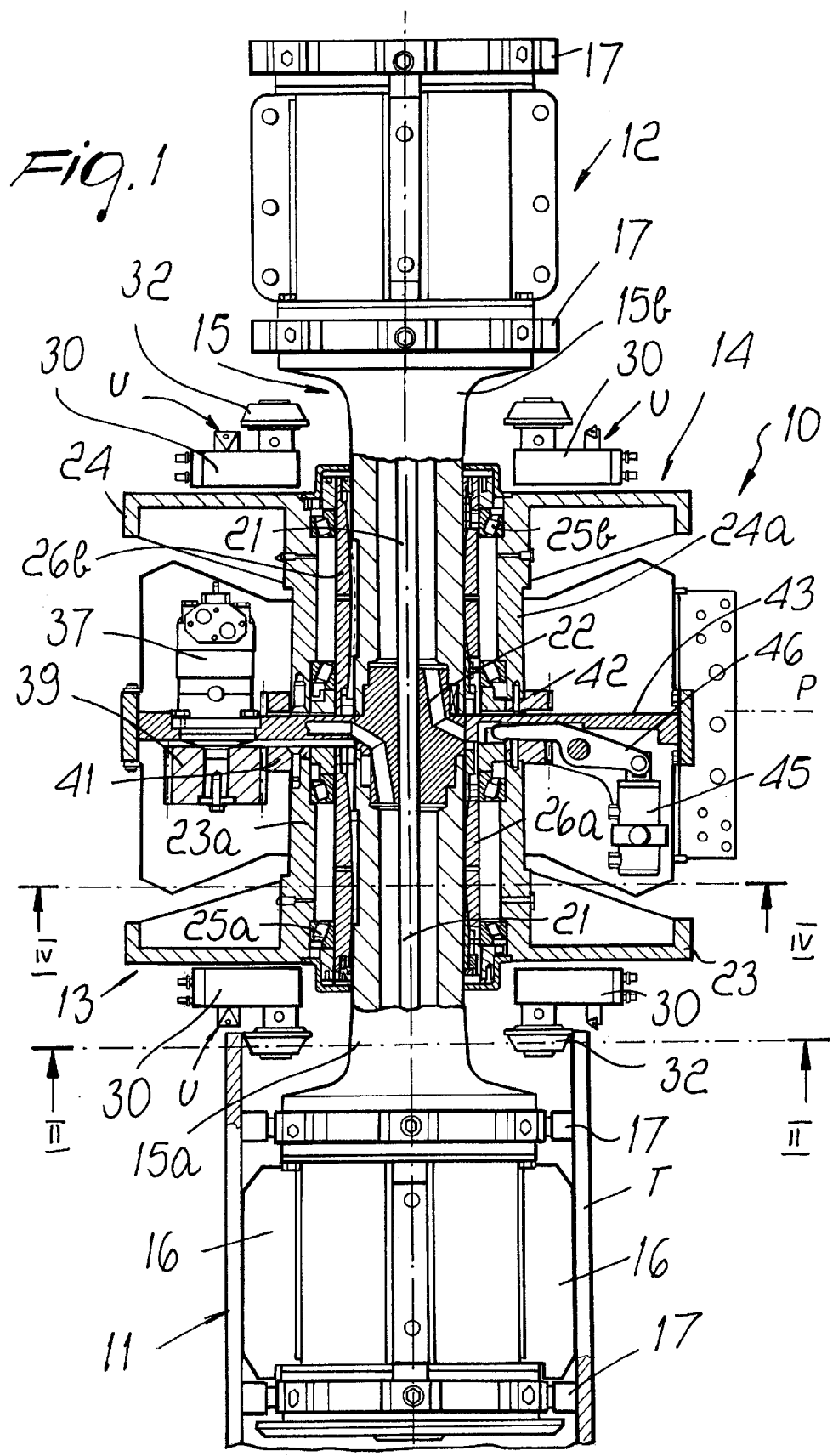
FIG. 1 is a partially sectional general view of the twin-head machine according to the invention.

With reference to the drawings, the reference numeral 10 designates a beveling machine as a whole, which substantially comprises two mutually opposite pressers 11 and 12, each designed to be accommodated inside the pipe T being machined in order to couple and center the entire machine 10, and two twin machining heads 13 and 14 which are also mutually opposite and rotate on the outside of the pipe in order to perform the required machining adapted to produce the welding bevel (not shown) on the head of said pipe. The pressers 11 and 12, structured so as to be perfectly identical to each other, are mutually rigidly connected by a central fixed shaft 15, and each presser comprises a set of axial guiding sliding blocks 16 and retention means constituted by two rings of pins 17 that can expand radially by means of the action of corresponding toggle lever systems 18 (FIG. 1a) actuated by respective double-acting hydraulic or pneumatic jacks 19–20. The central fixed shaft 15 is hollow and is formed by two mutually opposite segments 15a–15b connected by tension elements 21 having corresponding threaded ends that engage respective threaded holes of a rigid connecting hub 22 interposed between the shaft segments.

Figure 5:
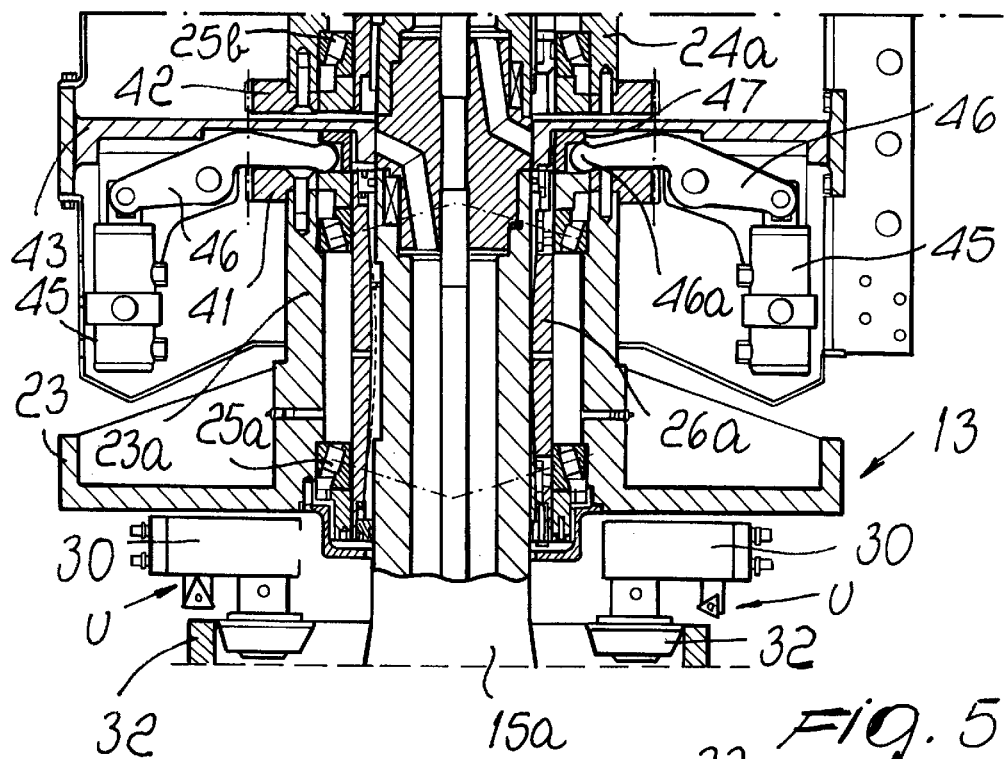
FIG. 5 is a view of a detail of FIG. 1, illustrating in detail only the system for the axial advancement of the machining heads.
Figure 5A:
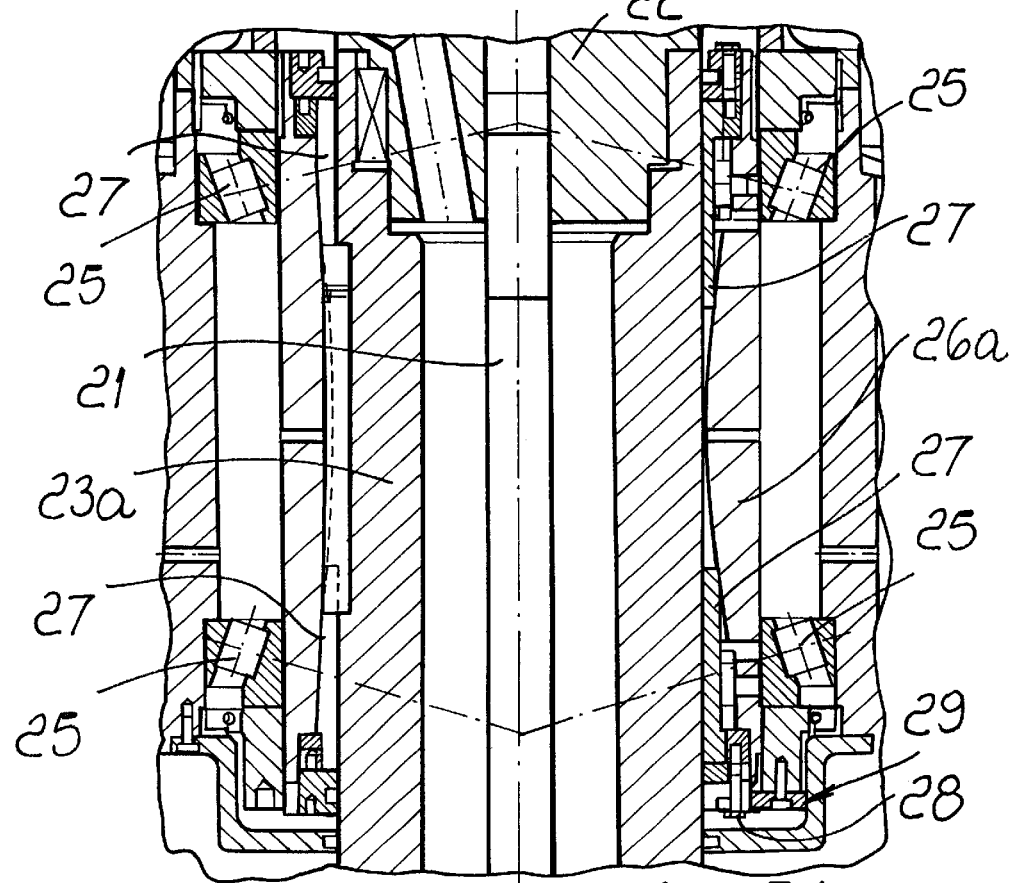
FIG. 5a is an enlarged-scale view of a detail of FIG. 5.

Each one of the machining heads 13–14, which are also identical one another, comprises a corresponding rotating disk 23–24, which is provided with a chip collection tray (not shown) and with a cylindrical sleeve 23a–24a that is mounted so that it can rotate and slide axially on the corresponding segment 15a–15b (FIGS. 1 and 5) of the shaft 15. For this purpose, the sleeves of the rotating disks are mounted so that they can rotate, with thrust bearings 25a–25b interposed, on respective bushes 26a–26b that are fitted so that they can slide on the corresponding shaft segment 15a–15b. The internal surface of each bush 26 is formed by inclined planes that outline a corresponding frustum-shaped surface with which a sliding cylindrical wedge 27 (FIG. 5a) engages, the wedge being provided with inclined planes that are complementary to the planes of the bush, in order to provide the bush with an axial compression preloading that contributes decisively to vibration reduction. Presser screws 28 press on the cylindrical wedge 27 for driving and react against shoulders 29 of the corresponding rotating disk.

Figure 3:
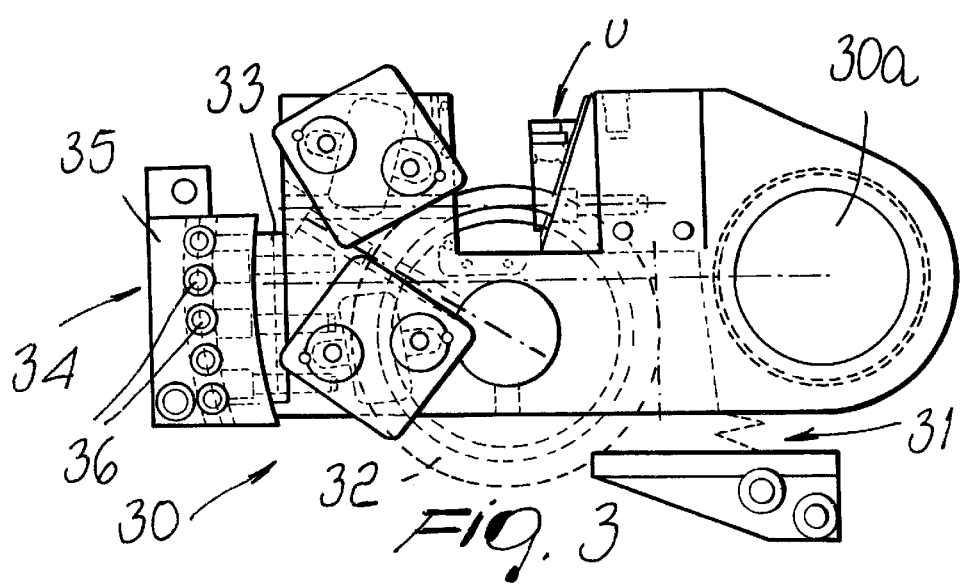
FIG. 3 is a view of a detail of a tool holder supported by the rotating disk of FIG. 2.
Figure 4:
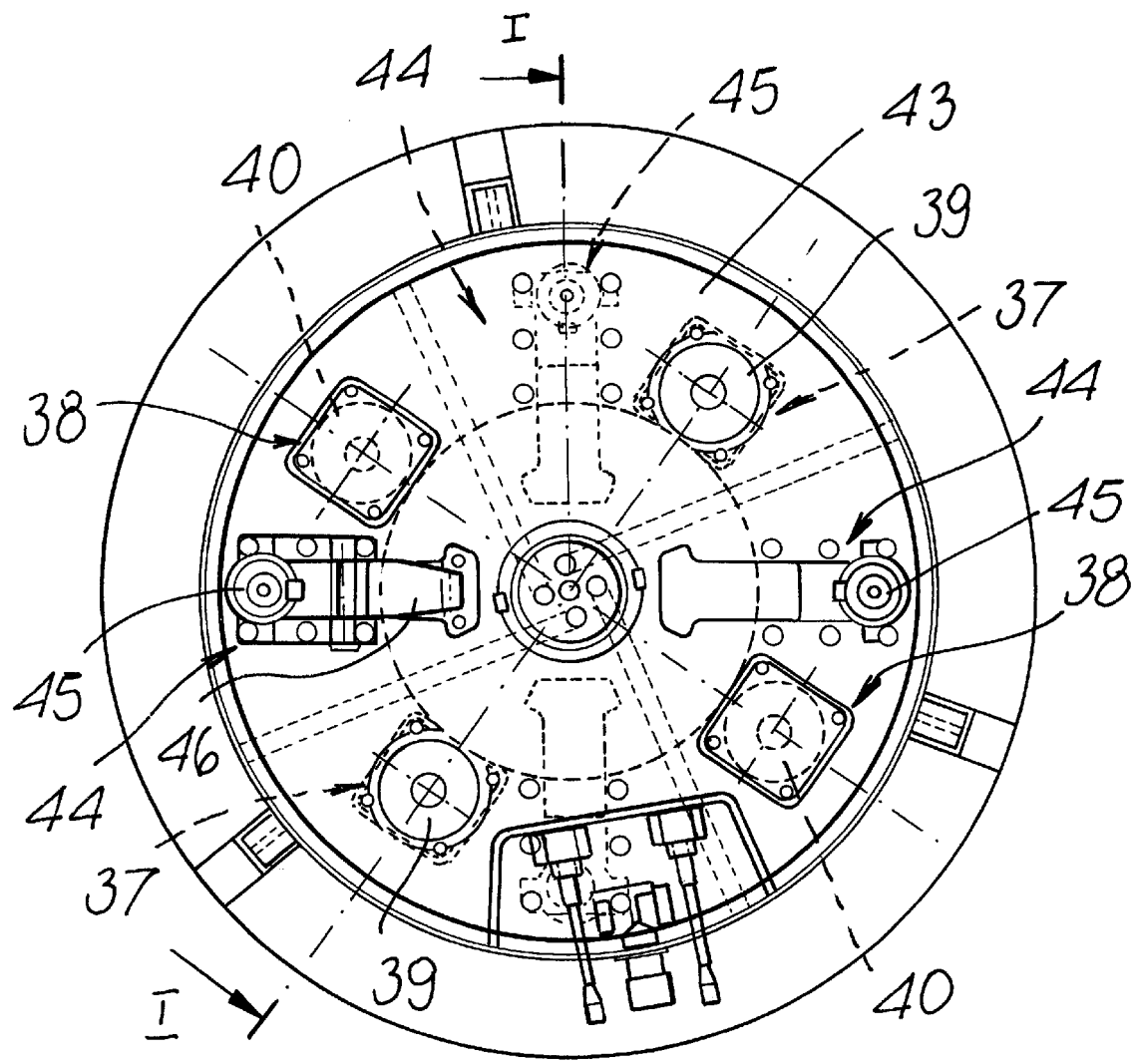
FIG. 4 is a transverse sectional view, taken along the line IV—IV of FIG. 1, illustrating in detail the motorization system of the machining heads.

Each rotating disk 23–24 has, on its front face, a plurality of tool holders 30, each of which is articulated to the respective disk by means of a sturdy pivot 30a and is subjected to the action of a spring 31 (FIG. 3). The spring actuates radially the holder towards the internal surface of the pipe T so as to move a conical wheel 32, arranged frontally with respect to the holder, into elastic contact engagement with the internal surface in order to force the holder and the tool U rigidly coupled thereto to follow the thickness and/or ovalization tolerances of the pipe.

According to the present invention, and again with the aim of eliminating vibrations during work, each holder 30 is provided with a sliding block 33 that is arranged at the opposite end with respect to the pivoting end and cooperates with a braking means 34 that is adapted to limit its freedom of oscillation and also to lock it fully when allowed by the geometric and mechanical characteristics of the pipe being machined (substantial lack of ovalizations, high thickness and great hardness of the material). The braking means is typically constituted by a sliding block clamping element that is provided with at least one jaw 35 subjected to the action of screws 36 that actuate it into forced contact engagement against the surface of the sliding block (FIG. 3).

Figure 1A:
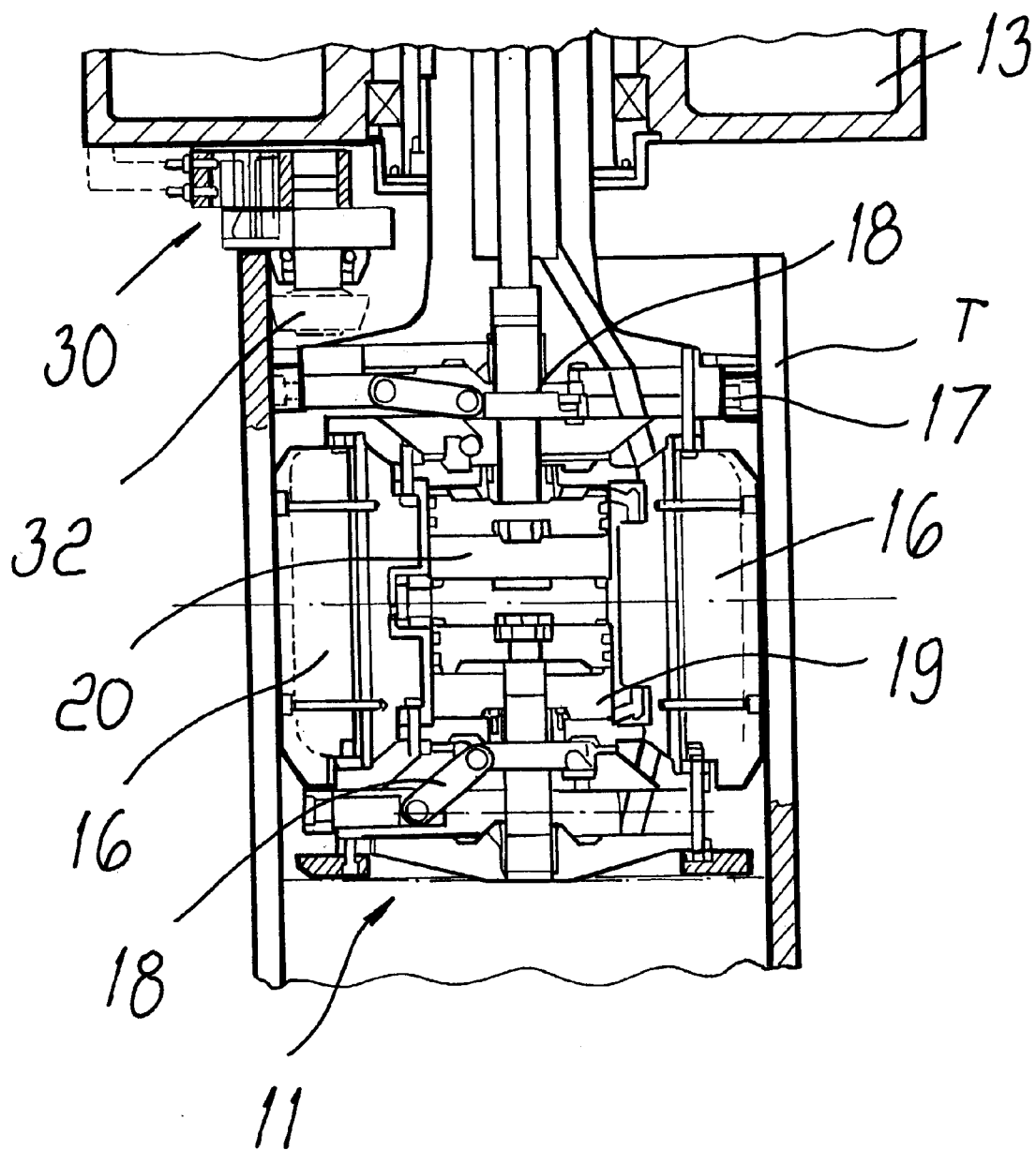
FIG. 1a is a longitudinal sectional view of one of the pressers.
Figure 2:
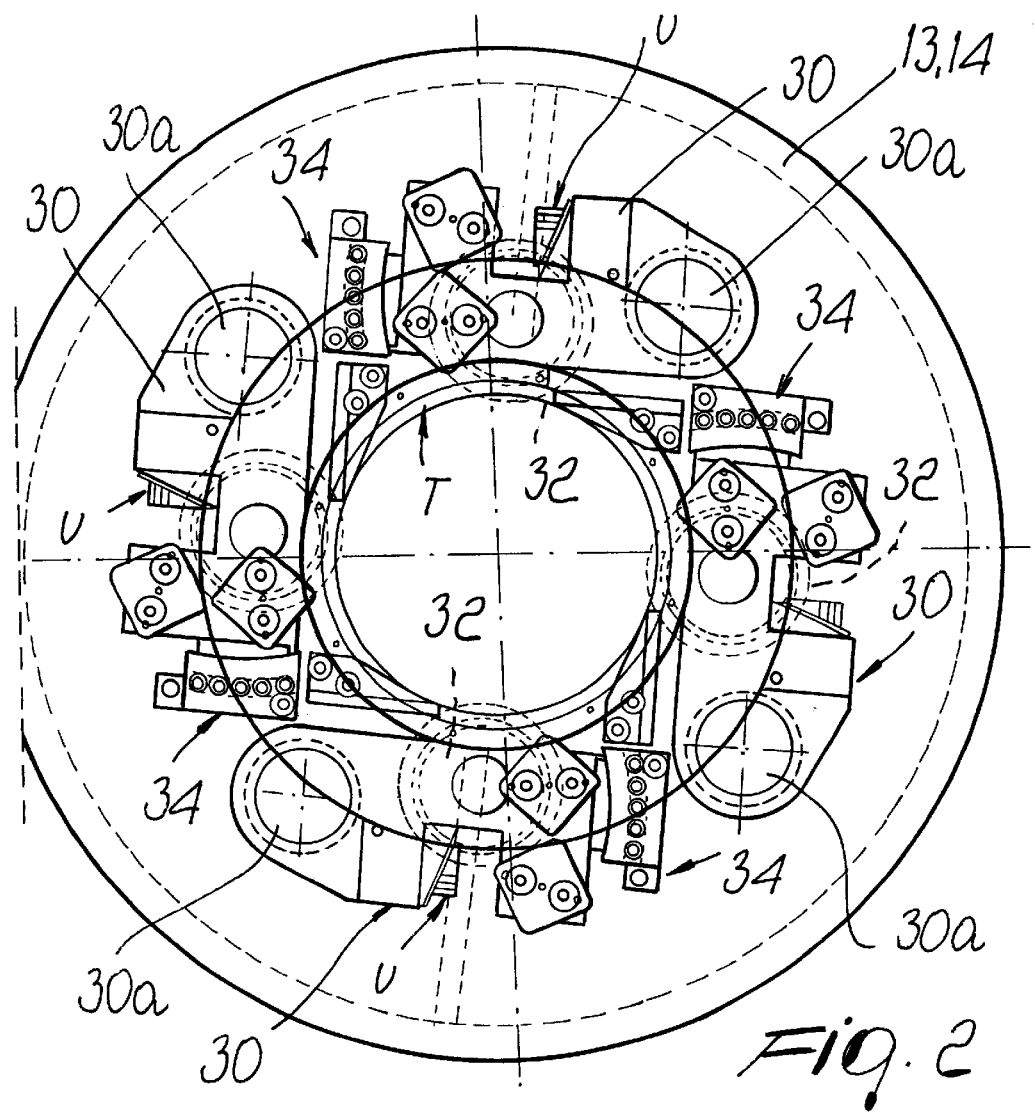
FIG. 2 is an enlarged-scale sectional view, taken along the line II—II of FIG. 1, of the front side of the rotating disk of a machining head.

The rotating disks 23–24 of the machining heads 13 and 14 are subjected to the action of corresponding mutually opposite pairs of hydraulic motors 37–38 provided with respective toothed pinions 39–40 that are adapted to mesh with corresponding gears 41–42 rigidly coupled respectively to the ends of the sleeves 23a and 24a (only one motor is shown in FIG. 1 in order to facilitate the understanding of the figure). Each mutually opposite pair of motors is supported by a sturdy circular plate 43 that is rigidly coupled to the fixed hub 22 and is arranged on the central plane P of the machine. Each pair of motors 37 and 38 is arranged so that its corresponding toothed pinions 39 and 40 are on either side of the plate 43, so that the pairs of pinions face, for meshing, the respective gears 41 and 42. The axial extension of the pinions is much greater (by a factor of approximately two) than the axial extension of the respective facing gears, so as to allow each pinion/gear pair to remain meshed even when the rotating disk 23–24 of the corresponding machining head moves axially to perform its working stroke. This stroke is produced by axial actuators that are associated with each head and are generally designated by the reference numeral 44; each actuator comprises a double-acting hydraulic or pneumatic jack 45 that is supported by the plate 43 and acts on the end of an oscillating lever 46 having a central fulcrum; the other end 46a of the lever is shaped like a spherical head and engages an undercut seat 47 provided at the end of each cylindrical sleeve 23a–24a.

The above described machine 10 is suspended, during use, from cables that cooperate with engagement handles 48–49 that are distributed symmetrically or asymmetrically on suspension plates 50–51 that are detachably coupled, by means of pins 52, to the axial guiding sliding blocks 16 of the presser that is not used; in the illustrated example, the presser element 11. The asymmetric suspension of the machine allows to tilt it and to use it easily in the machining of correspondingly inclined pipe ends.

Without altering the concept of the invention, the details of execution and the embodiments may of course vary extensively with respect to what has been described and illustrated by way of non-limitative example without thereby abandoning the scope of protection of the appended claims.

The disclosures in Italian Patent Application No. TO2000A001041 from which this application claims priority are incorporated herein by reference.

What is claimed is:

1. A twin-head beveling machine for high-precision machining on ends of large- and medium-diameter pipes, comprising two mutually opposite pressers and machining heads with a rotating disk, said pressers being rigidly connected to each other by a central fixed shaft, said heads being mounted so that they can rotate and move axially individually on said central fixed shaft; said machining heads being subjected to the action of hydraulic or pneumatic motor means and of axial movement means, which are activated by a respective hydraulic or pneumatic actuator and produce an axial working advancement of the respective head.

2. The machine according to claim 1, wherein the central fixed shaft is hollow and is formed by two mutually opposite segments that are connected by tension elements provided with corresponding threaded ends that engage in respective threaded holes of a rigid connecting hub interposed between said shaft segments.

3. The machine according to claim 1, wherein each of the machining heads, which are identical one another, comprises a respective bush and a corresponding rotating disk provided wick a cylindrical sleeve which is mounted so as to rotate and slide axially on a corresponding segment of the shaft with a said respective bush interposed.

4. The machine according to claim 2, wherein an internal surface of each said respective bush forms steps that outline a corresponding frustum-shaped surface with inclined planes with which a sliding cylindrical wedge engages, said wedge having inclined planes that are shaped complementarily to those of the bush, in order to provide said bush with an axial compression preloading that contributes decisively to vibration reduction; said cylindrical wedge being subjected to the action of axial presser screws that react on shoulders of the corresponding rotating disk.

5. The machine according to claim 3, wherein the rotating disk of each machining head has, on its front face, a plurality of tool holders, each articulated to the respective disk by means of a sturdy pivot and subjected to the action of a spring that actuates the holder radially towards the internal surface of the pipe, and wherein each holder is provided with a sliding block that is arranged at the opposite end with respect to the pivoting end and cooperates with a braking means that is adapted to limit the freedom of oscillation of said holder and also to lock said holder completely when allowed by the geometric and mechanical characteristics of the pipe being machined.

6. The machine according to claim 3, wherein the rotating disks of the machining heads are subjected to the action of corresponding mutually opposite pairs of hydraulic motors provided with respective toothed pinions adapted to mesh with corresponding gears rigidly coupled to the ends of the cylindrical sleeves of the respective disks.

7. The machine according to claim 3, wherein said means for the axial movement of the rotating disks of the machining heads comprise at least one double-acting hydraulic or pneumatic jack that acts on a first end of an oscillating lever that has a central pivot; a second end of said lever being shaped like a spherical head and being engaged in an undercut seat provided at an end of the respective cylindrical sleeve of each rotating disk.

8. The machine according to claim 6, wherein the mutually opposite pairs of hydraulic motors for moving the rotating disks are supported by a sturdy circular plate that is rigidly coupled to the hub that connects the two segments of the fixed central shaft and is arranged on a central plane of the machine, and wherein each pair of motors is arranged with corresponding toothed pinions on either side of said plate so that the pinions of each pair face, for meshing, the gear for moving the rotating disk of the corresponding machining head.

9. The machine according to claim 8, wherein said hydraulic or pneumatic jack and said centrally-pivoted lever are respectively rigidly coupled, and pivoted so as to be able to oscillate, to said circular plate.

* * * * *